Patented Mar. 2, 1943

2,312,705

UNITED STATES PATENT OFFICE 2,312,705

REACTION PRODUCT OF ALDEHYDES AND DIAZINE DERIVATIVES

Gaetano F. D'Alelio, Pittsfield, Mass., assignor to General Electric Company, a corporation of New York No Drawing. Application January 30, 1942, Serial No. 428,906

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a diazine derivative corresponding to the following general formula:

I 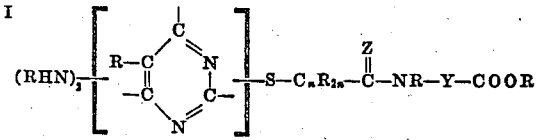

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halohydrocarbon radicals. Since $n$ represents an integer which is 1 or 2, it will be seen that the linkage of the carbocyclic-carbamyl-alkyl grouping to the sulfur atom in all cases will be alpha or beta to the carbocyclic-carbamyl or -thiocarbamyl grouping. It also will be observed that linkage of the diazinyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, heptyl, octyl, nonyl, etc.), including cycloaliphatic (e. g., cyclopentyl, cyclopentenyl, cyclohexyl, cyclohexenyl, cycloheptyl, cycloheptenyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, isoamylphenyl, etc.); aryl-substituted aliphatic (e. g., benzyl, phenylethyl, phenylpropyl, phenylisopropyl, phenylamyl, cinnamyl, etc.); and their homologues, as well as those groups with one or more of their hydrogen atoms substituted by, for example, a halogen, specifically chlorine, fluorine, bromine or iodine. Specific examples of halogeno-substituted hydrocarbon radicals are chloromethyl, chloroethyl, bromomethyl, bromoethyl, chloropropyl, bromopropyl, iodopropyl, iodoamyl, chloroamyl, bromoamyl, chlorophenyl, bromophenyl, iodophenyl, fluorophenyl, dichlorophenyl, trichlorophenyl, chloronaphthyl, dibromophenyl, tribromophenyl, chlorotolyl, iodotolyl, dichlorotolyl, bromotolyl, dibromotolyl, fluorotolyl, chlorocyclohexyl, chlorocyclohexenyl, ethyl chlorophenyl, ethyl bromophenyl, propyl chlorophenyl, phenyl chloroethyl, chlorohexyl, etc. Preferably R in Formula I is hydrogen. Also especially suitable for use in carrying the present invention into effect are diazine derivatives corresponding to the general formulas II 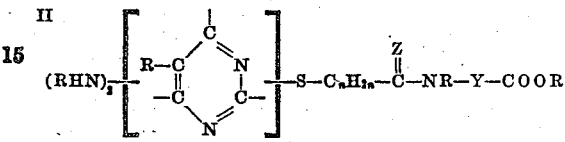

and, more particularly,

III 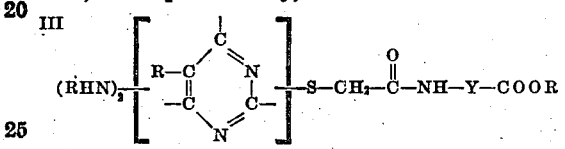

where $n$, Z, Y and R have the same meanings as above given with reference to Formula I.

Illustrative examples of divalent carbocyclic radicals that Y in Formulas I, II and III may represent are: divalent aryl, e. g., phenylene, xenylene, naphthylene, etc.; divalent aliphatic-aryl, e. g., 2,5-toluylene, 1,4-dimethyl 2,3-phenylene, etc.; divalent cycloaliphatic, e. g., cyclopentylene, cyclohexylene, cyclopentenylene, cyclohexenylene, cycloheptylene, etc.; and their homologues, as well as those divalent carbocyclic radicals with one or more of their hydrogen atoms replaced by a substituent, e. g., halogeno, amino, acetyl, hydroxy, acetoxy, alkoxy, aryloxy, sulfamyl, alkyl, alkenyl, a —COOR group or groups in addition to the single —COOR group shown in the above formulas, etc. Specific examples of substituted divalent carbocyclic radicals are chlorophenylene, bromophenylene, chloronaphthylene, bromonaphthylene, bromo 2,5-toluylene, chlorocyclopentylene, chlorocyclopentenylene, hydroxyphenylene, ethoxyphenylene, acetophenylene, acetoxyphenylene, bromocyclopentylene, aminophenylene, phenoxyphenylene, sulfamylphenylene, methylphenylene (toluylene), allylphenylene, etc. Preferably Y is phenylene or methylphenylene.

Instead of the 1,3- or meta-diazine derivatives represented by the above formulas, the corresponding 1,2- or ortho-diazines (pyridazines) or the 1,4- or para-diazines (pyrazines) may be used. Also, instead of the diazinyl monosulfides represented by the above formulas, the di- and tri-sulfides of the diazines (ortho, meta or para) may be employed.

The diazine derivatives that are used in carrying the present invention into effect are more fully described and are specifically claimed in my copending application Serial No. 428,905, filed concurrently herewith and assigned to the same assignee as the present invention. As pointed out in this copending application, a suitable method of preparing the diazine derivatives employed in practicing the present invention comprises effecting reaction between a diamino [(—NHR)$_2$] mercapto pyrimidine and a carboxy-, carboaliphaticoxy- (including carbocycloaliphaticoxy-) or carboaromaticoxy - carbocyclic-carbamyl or -thiocarbamyl-alkyl halide in the presence of a hydrohalide acceptor, e. g., an alkali-metal hydroxide. When a carboxy(—COOH)— carbocyclic-carbamyl or -thiocarbamyl-alkyl halide is used as a starting reactant and the proportions of reactants and reaction conditions are such that the hydrogen atom of the —COOH group of the carboxy-carbocyclic compound is replaced by the residue of the hydrohalide acceptor, e. g., by an alkali metal, the carboxy compound desired as a final product is obtained by treating this intermediate product with hydrochloric, hydrobromic, sulfuric or other suitable inorganic or organic acid in an amount just sufficient to form the desired carboxy derivative.

Specific examples of diazinyl carbocyclic-carbamyl-alkyl sulfides and diazinyl carbocyclic-thiocarbamyl-alkyl sulfides that may be used in producing my new condensation products are listed below:

The diamino pyrimidyl ortho-, meta- and para-, carboxy-, carboalkoxy- and carboaryloxy-phenyl-carbamyl-methyl sulfides The diamino pyrimidyl ortho-, meta- and para-, carboxy-, carboalkoxy- and carboaryloxy-phenyl-thiocarbamyl-methyl sulfides The diamino pyrimidyl ortho-, meta- and para-, carboxy-, carboalkoxy- and carboaryloxy-tolyl-carbamyl-methyl sulfides The diamino pyrimidyl ortho-, meta- and para-, carboxy-, carboalkoxy- and carboaryloxy-tolyl-thiocarbamyl-methyl sulfides The di-(methylamino) pyrimidyl ortho-, meta- and para-, carboxy-, carboalkoxy- and carboaryloxy-phenyl-carbamyl-methyl sulfides The di-(ethylamino) pyrimidyl ortho-, meta- and para-, carboxy-, carboalkoxy- and carboaryloxy-phenyl-thiocarbamyl-methyl sulfides The di-(anilino) pyrimidyl ortho-, meta- and para-, carboxy-, carboalkoxy- and carboaryloxy-tolyl-carbamyl-methyl sulfides The di-(cyclohexylamino) pyrimidyl ortho-, meta- and para-, carboxy-, carboaryloxy- and carboalkoxy - tolyl-thiocarbamyl-methyl sulfides The diamino pyrimidyl alpha-(ortho-, meta- and para-, carboxy-, carboalkoxy- and carboaryloxy-phenyl-carbamyl-ethyl) sulfides The diamino pyrimidyl beta-(ortho-, meta- and para-, carboxy-, carboalkoxy- and carboaryloxy-phenyl-carbamyl-ethyl) sulfides The diamino pyrimidyl alpha-(ortho-, meta- and para-, carboxy-, carboalkoxy- and carboaryloxy-phenyl-thiocarbamyl-ethyl) sulfides The diamino pyrimidyl beta-(ortho-, meta- and para-, carboxy-, carboalkoxy- and carboaryloxy-phenyl-thiocarbamyl-ethyl) sulfides The diamino pyrimidyl ortho-, meta- and para-, carbohaloalkoxy- and carbohaloaryloxy-phenyl-carbamyl-methyl sulfides The diamino pyrimidyl ortho-, meta- and para-, carbocycloaliphaticoxy- and carbohalocycloaliphaticoxy-phenyl-carbamyl-methyl sulfides The diamino pyrimidyl ortho-, meta- and para-, carboalkenyloxy- and carbohaloalkenyloxy-tolyl-carbamyl-methyl sulfides The diamino pyrimidyl ortho-, meta- and para-, carbocycloalkenyloxy - and carbohalocycloalkenyloxy-phenyl-carbamyl-methyl sulfides The diamino pyrimidyl alpha-(ortho-, meta- and para-, carboxy-, carboalkoxy- and carboaryloxy-tolyl-carbamyl-ethyl) sulfides The diamino pyrimidyl beta-(ortho-, meta- and para-, carboxy-, carboalkoxy- and carboaryloxy-tolyl-carbamyl-ethyl) sulfides The diamino pyrimidyl alpha-(ortho-, meta- and para-, carboxy-, carboalkoxy- and carboaryloxy-tolyl-thiocarbamyl-ethyl) sulfides The diamino pyrimidyl beta-(ortho-, meta- and para-, carboxy-, carboalkoxy- and carboaryloxy-tolyl-thiocarbamyl-ethyl) sulfides The 4,6-di-(methylamino) 5-alkyl (e. g., methyl, ethyl, etc.) pyrimidyl-2 alpha-(ortho-, meta- and para-, carboxy-, carboalkoxy- and carboaryloxy-phenyl-carbamyl-ethyl) sulfides The 2,6-di-(propylamino) 5-aryl (e. g., phenyl, naphthyl, etc.) pyrimidyl-4 beta-(ortho-, meta- and para-, carboxy-, carboalkoxy- and carboaryloxy-phenyl-carbamyl-ethyl) sulfides The 4,6-di-(anilino) 5-cycloaliphatic (e. g., cyclohexyl, cyclohexenyl, etc.) pyrimidyl-2 alpha-(ortho-, meta- and para-, carboxy-, carboalkoxy- and carboaryloxy-tolyl - carbamyl-ethyl) sulfides The 2,6-di-(cycloheptylamino) 5-alkenyl (e. g., butenyl, hexenyl, etc.) pyrimidyl-4 beta-ortho-, meta- and para-, carboxy-, carboalkoxy- and carboaryloxy-tolyl - carbamyl-ethyl) sulfides The di-(ethylamino) pyrimidyl alpha-(ortho-, meta- and para-, carboxy-, carboalkoxy- and carboaryloxy - phenyl - thiocarbamyl-ethyl) sulfides 4,6-diamino pyrimidyl-2 carbobromophenoxy-phenyl-carbamyl-methyl sulfide 2,6-diamino 5-benzyl pyrimidyl-4 carbochloroethoxyphenyl-carbamyl-methyl sulfide 4,6-diamino 5-xenyl pyrimidyl-2 carbomethoxy cycloheptenyl-carbamyl-methyl sulfide 4,6-diamino pyrimidyl-2 carbobromophenoxycyclohexyl-carbamyl-methyl sulfide 4,6-diamino 5-chlorotolyl pyrimidyl-2 alpha-(ortho-carbobutoxytolyl-carbamyl-ethyl) sulfide 4-ethylamino 5-heptyl 6-amino pyrimidyl-2 beta-(meta - carboethoxyphenyl-carbamyl-pentyl) sulfide 2,6 - diamino 5 - iodophenyl pyrimidyl-4 beta-(para - carboethoxytolyl-thiocarbamyl-ethyl) sulfide 2-chlorocyclopentylamino 5-chloronaphthyl 6-benzylamino pyrimidyl-2 ortho-carbobutoxyphenyl-(bromoethyl)-carbamyl-methyl sulfide 4-amino 6-fluorotoluido pyrimidyl-2 carbopentoxytolyl-carbamyl-methyl sulfide 4-bromotoluido 6-benzylamino pyrimidyl-2 carbomethoxycyclopentyl - carbamyl - (tolyl)-methyl sulfide 4,6-diamino 5-methyl pyrimidyl-2 para-carboxyphenyl-carbamyl-methyl sulfide 4 - chlorobenzylamino 5-chlorobutyl 6-bromoethylamino pyrimidyl-2 beta- [carboxyxenyl-(butylphenyl)-carbamyl - (alpha-naphthyl)-ethyl] sulfide 4,6-diamino 5-bromotolyl pyrimidyl-2 beta- [4'-carboethoxy 2'-chloro cyclopentyl-(xenyl)-carbamyl-(beta-chloroxylyl)-ethyl] sulfide Additional examples of diazine derivatives that may be employed in producing the new condensation products of the present invention are given in my above-identified copending application Serial No. 428,905.

The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and certain diazinyl carbocyclic-carbamyl (or thiocarbamyl) alkyl sulfides, numerous examples of which have been given above and in the above-identified copending application.

It has been suggested heretofore that resins be made by condensing an aldehyde with certain pyrimidine thioethers, but such known resins are not entirely satisfactory for use in many applications, for instance in the production of molding compounds having a high plastic flow during molding combined with a rapid cure to an insoluble, infusible state. Surprisingly it was found that the heat-curable resinous condensation products of this invention and molding compositions made therefrom show excellent flow characteristics during a short curing cycle. This is a property that is particularly desirable in a thermosetting resin and molding compound. The molded articles have a high dielectric strength and excellent resistance to arcing. They have a good surface finish and excellent resistance to water, being better than the ordinary urea-formaldehyde resins in this respect. The cured resins have a high resistance to heat and abrasion, and therefore are especially suitable for use where optimum heat- and abrasion-resistance are properties of primary importance.

In practicing my invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivatives may be carried out in the presence of solvents or diluents, fillers, other natural or synthetic resinous bodies, or while admixed with other materials that also can react with the aldehydic reactant or with the diazine derivative, e. g., ketones, urea

thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940; monoamides of monocarboxylic and polycarboxylic acids and polyamides of polycarboxylic acids, e. g., acetamide, halogenated acetamides, (e. g., a chlorinated acetamide), maleic monoamide, malonic monoamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent 2,239,441; monohydric and polyhydric alcohols, e. g., butyl alcohol, amyl alcohol, isoamyl alcohol, ethylene glycol, glycerine, polyvinyl alcohol, etc.; amines, including aromatic amines, e. g., aniline, etc.; and the like.

The modifying reactants may be incorporated with the diazine derivative and the aldehyde by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising (1) urea or melamine or urea and melamine, (2) a diazine derivative of the kind described herein and in my copending application Serial No. 428,905, for example, a diamino pyrimidyl ortho-, meta- or para-carboalkoxyphenyl (e. g., carboethoxyphenyl) or -carboaryloxyphenyl (e. g., carbophenoxyphenyl) carbamyl-methyl sulfide, a diamino pyrimidyl ortho-, meta- or para-carboalkoxytolyl-carbamyl-methyl sulfide, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter I may effect reaction between this partial condensation product and, for example, a curing reactant, specifically a chlorinated acetamide, to obtain a heat-curable composition.

Some of the condenstion products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

Depending upon the particular conditions of reaction and the particular reactants employed, the intermediate or partial condensation products vary from clear, colorless or colored, syrupy, water-soluble liquids to viscous, milky dispersions and gel-like masses of decreased solubility in ordinary solvents, e. g., ethyl alcohol, butyl alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration. All parts are by weight.

*Example 1*

|  | Parts |
|---|---|
| 4,6-diamino pyrimidyl-2 para-carboethoxy-phenyl-carbamyl-methyl sulfide | 34.7 |
| Aqueous formaldehyde (approx. 37.1% HCHO) | 48.6 |
| Aqueous ammonia (approx. 28% NH₃) | 3.0 |
| Aqueous solution of sodium hydroxide (0.5 N) | 2.0 |
| Water | 20.0 |
| Chloroacetamide (monochloroacetamide) | 0.3 |

All of the above ingredients were mixed and were shaken intermittently at room temperature for one hour. The resulting reaction product was mixed with 24.1 parts alpha cellulose in flock form and 0.1 part of a mold lubricant, specifically zinc stearate. The resulting composition was dried at room temperature. A sample of the dried compound, when placed on a 140° C. hotplate, bodied to a resinous mass and slowly cured to an infusible state. This example shows that reaction between the components can be effected at normal temperatures. Of course it will be understood by those skilled in the art that the above ingredients also may be caused to react by heating at an elevated temperature, for example at boiling temperature under reflux.

*Example 2*

|  | Parts |
|---|---|
| 4,6-diamino pyrimidyl-2 para-carboethoxy-phenyl-carbamyl-methyl sulfide | 17.9 |
| Urea | 15.0 |
| Aqueous formaldehyde (approx. 37.1% HCHO) | 48.6 |
| Aqueous ammonia (approx. 28% NH₃) | 3.0 |
| Aqueous solution of sodium hydroxide (0.5 N) | 1.6 |
| Water | 20.0 |
| Chloroacetamide | 0.4 |

All of the above ingredients with the exception of the chloroacetamide were heated together under reflux at the boiling temperature of the mass for 2 minutes. At the end of this period of time a resinous layer separated as a viscous, molasses-like syrup. The reaction product was mixed with 28.8 parts alpha cellulose, 0.1 part zinc stearate and the above-stated amount of chloroacetamide. The resulting wet molding composition was dried at room temperature until sufficient moisture had been removed to provide a molding material that could be molded satisfactorily. A sample of the dried and ground molding compound was molded for 5 minutes at 140° C. under a pressure of 4,500 pounds per square inch. The molded disk was removed hot from the mold. It did not become distorted upon cooling to room temperature. The molded piece was well cured throughout and had a homogeneous and well-knit structure. It had very good resistance to water, as indicated by the fact that when it was immersed in boiling water for 15 minutes followed by immersion in cold water for 5 minutes it absorbed only 1.4% by weight of water. The ordinary urea-formaldehyde resins yield molded articles which, when similarly tested, show a water-absorption value of about 5% to 7%. The molding compound of this example showed excellent plastic flow during molding.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of active and latent curing catalysts and of curing reactants that may be employed to accelerate or to effect the curing of the thermosetting or potentially thermosetting resins of this and other examples are given in various copending applications of mine, for instance in copending applications Serial No. 346,962, filed July 23, 1940, and Serial No. 354,395, filed August 27, 1940, both of which applications are assigned to the same assignee as the present invention.

Example 3

| | Parts |
|---|---|
| 4,6-diamino pyrimidyl-2 para-carboethoxy-phenyl-carbamyl-methyl sulfide | 17.9 |
| Melamine | 31.5 |
| Aqueous formaldehyde (approx. 37.1% HCHO) | 78.0 |
| Aqueous ammonia (approx. 28% NH$_3$) | 2.0 |
| Aqueous solution of sodium hydroxide (0.5 N) | 2.5 |
| Chloroacetamide | 0.3 |

All of the above components with the exception of the chloroacetamide were heated together under reflux at boiling temperature for 7 minutes. The resulting resinous syrup was mixed with 44.1 parts alpha cellulose, 0.2 part zinc stearate and the above-stated amount of chloroacetamide. The mo'ding compound produced in this manner was dried at room temperature as described under Example 2. A sample of the dried and ground molding compound was molded for 5 minutes at 140 C. under a pressure of 4,000 pounds per square inch. The molded piece had a well-knit, homogeneous and well-cured structure. It had excellent resistance to water, as shown by the fact that it absorbed only 0.55% by weight of water when tested for its water-resistance characteristics as described under Example 2. The molding compound exhibited good plasticity during molding.

Example 4

| | Parts |
|---|---|
| 4,6-diamino pyrimidyl-2 para-carboethoxy-phenyl-carbamyl-methyl sulfide | 17.9 |
| Dimethylol urea (commercial grade containing approx. 11% by weight of water) | 54.0 |
| Aqueous ammonia (approx. 28% NH$_3$) | 3.5 |
| Aqueous solution of sodium hydroxide (0.5 N) | 2.5 |
| Water | 78.7 |
| Chloroacetamide | 0.4 | were heated together under reflux at boiling temperature for 3 minutes, at the end of which period of time the reaction mass began to separate into 2 layers. The resinified mixture was compounded with 52.3 parts alpha cellulose and 0.3 part zinc stearate. The wet compound was dried at room temperature as described under Example 2. A well-cured molded piece having a well-knit and homogeneous structure was produced by molding a sample of the dried and ground molding compound for 5 minutes at 140° C. under a pressure of 5,600 pounds per square inch. The molded piece had a water-absorption value of only 1.8%, as determined by the method described under Example 2. The molding compound had very good plasticity during molding.

Example 5

| | Parts |
|---|---|
| 4,6-diamino pyrimidyl-2 para-carboethoxy-phenyl-carbamyl-methyl sulfide | 17.9 |
| Aminotriazole, specifically 1-carbamyl guanazole | 14.2 |
| Aqueous formaldehyde (approx. 37.1% HCHO) | 40.5 |
| Aqueous ammonia (approx. 28% NH$_3$) | 1.5 |
| Aqueous solution of sodium hydroxide (0.5 N) | 1.0 |
| Chloroacetamide | 0.3 |

All of the above components with the exception of the aminotriazole and the chloroacetamide were heated together under reflux at boiling temperature for 3 minutes. At the end of this period of time the aminotriazole was added and refluxing was continued for an additional 2 minutes. The chloroacetamide was now added and the resulting resinous syrup immediately was mixed with 25.1 parts alpha cellulose and 0.1 part zinc stearate. The resulting wet molding compound was dried at room temperature as described under Example 2. A sample of the dried and ground molding compound was molded into the form of a disk, using a molding time of 5 minutes, a molding temperature of 140° C. and a molding pressure of 4,500 pounds per square inch. The molded disk was well knit and had a homogeneous and well-cured structure. The molding compound showed good plasticity during molding. The molded disk had good water resistance when tested for its water-resistance characteristics as described under Example 2.

Example 6

| | Parts |
|---|---|
| 4,6-diamino pyrimidyl-2 para-carboethoxy-phenyl-carbamyl-methyl sulfide | 17.4 |
| Furfural | 48.0 |
| Aqueous ammonia (approx. 28% NH$_3$) | 1.0 |
| Aqueous solution of sodium hydroxide (0.5 N) | 1.0 | were heated together under reflux at boiling temperature for 15 minutes. The resulting resinous syrup cured to a semi-infusible state when a small sample of it was heated on a 140° C. hotplate. The addition of chloroacetamide, glycine, phenacyl chloride and other curing agents such as mentioned under Example 2 accelerated the conversion of the resin to a semi-infusible state when the individual samples containing the curing agent were heated on a 140° C. hotplate. Upon further heating at this temperature the resin containing the curing agent cured slowly to a hard, infusible mass. The resin film formed in this manner could be removed from the hotplate in sheet form. This sheet material was extremely flexible and possessed excellent adhesive and cohesive characteristics. The resinous composition of this example may be used as a modifier of other synthetic resins or in the preparation of various coating materials and molding compounds.

Example 7

| | Parts |
|---|---|
| 4,6-diamino pyrimidyl-2 para-carboethoxy-phenyl-carbamyl-methyl sulfide | 17.4 |
| Butyl alcohol | 37.0 |
| Aqueous formaldehyde (approx. 37.1% HCHO) | 40.5 |
| Aqueous ammonia (approx. 28% NH$_3$) | 1.0 |
| Aqueous solution of sodium hydroxide (0.5 N) | 1.0 | were heated together under reflux at boiling temperature for 15 minutes. The resulting syrupy condensation product was dehydrated by heating it on a hotplate. The dehydrated syrupy resin was soluble in ethyl alcohol, benzyl alcohol, dioxane, ethylene glycol, Cellosolve and various other organic solvents. A sample of the dehydrated syrup was applied to a glass plate and the coated plate then was baked for several hours at 70° C. A hard, transparent, water-white, water-resistant, smooth and tightly adherent film was formed on the plate. The resinous material of this example is particularly suitable for use in the production of liquid coating compositions.

Example 8

| | Parts |
|---|---|
| 4,6-diamino pyrimidyl-2 para-carboethoxyphenyl-carbamyl-methyl sulfide | 17.4 |
| Acrolein | 28.0 |
| Aqueous solution of sodium hydroxide (0.5 N) | 1.0 |
| Water | 20.0 |

The above ingredients were mixed, adding the acrolein last, and the mixture then was heated under reflux at boiling temperature for 15 minutes. When a sample of the resulting resinous material was heated on a 140° C. hotplate it set to a semi-infusible state. During the period just prior to setting, the resin could be drawn into the form of fibers several inches in length. Although these fibers became brittle upon cooling to room temperature, their formation indicates that the resinous material of this example might be used as a modifier of various fiber-forming resins. The addition of chloroacetamide, phthalic monoamide, glycine, aminoacetamide hydrochloride and other curing agents such as mentioned under Example 2, followed by heating on a 140° C. hotplate, caused the resin to convert to an infusible state. The resinous product of this example is suitable for use in various coating, impregnating and molding compositions. The properties of the resin indicate that it would be particularly useful as a modifier of molding compositions where strength and toughness in the molded article are desired.

Example 9

| | Parts |
|---|---|
| 4,6-diamino pyrimidyl-2 para-carboethoxyphenyl-carbamyl-methyl sulfide | 17.4 |
| Acetamide | 3.0 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at boiling temperature for 11 minutes, yielding a resinous syrup that was clear while hot but which clouded upon cooling to room temperature. A sample of the syrupy condensation product was placed on a 140° C. hotplate and was stroked with a spatula. The resin cured to a semi-infusible state. The addition of glycine, phthalic monoamide, polysalicylide and other curing agents such as mentioned under Example 2 were not effective in curing the resin to a completely infusible state. The resinous material of this example may be used as a modifier of other synthetic resins. For instance, it may be used as a modifier of rapidly curing aminoplasts to control their flow or plasticity characteristics. It also may be used in coating compositions to provide materials of better flow properties.

Example 10

| | Parts |
|---|---|
| 4,6-diamino pyrimidyl-2 para-carboethoxyphenyl-carbamyl-methyl sulfide | 17.4 |
| Diethyl malonate | 8.0 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at boiling temperature for 5 minutes, yielding a resinous syrup having properties very similar to the product of the previous example.

Example 11

| | Parts |
|---|---|
| 4,6-diamino pyrimidyl-2 para-carboethoxyphenyl-carbamyl-methyl sulfide | 17.4 |
| Glycerine | 4.6 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at boiling temperature for 15 minutes. The resulting resinous condensation product was dehydrated. The dehydrated syrup was soluble in ethyl alcohol, butyl alcohol, benzyl alcohol, dioxane, ethylene glycol, Cellosolve and other organic solvents. A sample of the dehydrated syrup was applied to a glass plate and the coated plate then was baked for several hours at 70° C. A moderately hard, smooth, water-white, transparent and tightly adherent film was formed on the plate. A film of similar properties is obtained when curing agents, for example hydrochloric acid, are incorporated into the dehydrated syrup prior to coating the plate with the same. The resin of this example is particularly suitable for use as a plasticizer in molding compounds and coating compositions where products of improved flow characteristics are desired. For example, it may be used as a modifier of varnishes of the aminoplast and alkyd-resin types.

Example 12

| | Parts |
|---|---|
| 4,6-diamino pyrimidyl-2 para-carboethoxyphenyl-carbamyl-methyl sulfide | 17.4 |
| Polyvinyl alcohol | 2.2 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 |
| Water | 20.0 | were heated together under reflux at boiling temperature for 10 minutes. When a sample of the resulting resinous syrup was heated on a 140° C. hotplate, it set to a semi-infusible mass. The addition of chloroacetamide, glycine and other curing agents such as mentioned under Example 2 to the resinous syrup, followed by heating on a 140° C. hotplate, caused the resin to cure to an infusible mass. Samples of the resinous syrup, both with and without a curing agent such as a trace of hydrochloric acid, were applied to glass plates and the coated plates then were baked for several hours at 70° C. In all cases the baked films were hard, transparent, water-white, water-resistant and smooth. The films adhered tightly to the glass plates. The resinous material of this example may be used in the preparation of various molding and coating compositions.

It will be understood, of course, by those skilled in the art that the reaction between the aldehyde and the diazine derivative may be effected at temperatures ranging, for example, from room temperature to the fusion or boiling temperatures of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 2 to 12, inclusive, at boiling temperature under reflux, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that my invention is not limited to condensation products obtained by reaction of ingredients comprising an aldehyde and the specific diamino pyrimidyl carboalkoxycarbocycliccarbamyl-alkyl sulfide named in the above illustrative examples. Thus, instead of 4,6-diamino pyrimidyl-2 para-carboethoxyphenyl-carbamyl-methyl sulfide, I may use the corresponding ortho or meta derivatives, the 2,6-diamino pyrimidyl-4 (2,4-diamino pyrimidyl-6) ortho-, meta- or para-carboethoxyphenyl-carbamyl-methyl sulfides, the diamino pyrimidyl carboalkoxytolyl-carbamyl-methyl sulfides, the diamino pyrimidyl carboaryloxycarbocyclic (e. g., carbophenoxyphenyl) carbamyl-methyl sulfides, the diamino pyrimidyl carboxycarbocyclic (e. g., carboxyphenyl) carbamyl-methyl sulfides, or any other organic sulfide (or mixture thereof) of the kind with which this invention is concerned, numerous examples of which compounds have been given hereinbefore and in my copending application Serial No. 428,905.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, methacrolein, crotonaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, selenoureas, thioureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending, for example, upon the particular properties desired in the final product. Ordinarily these reactants are employed in an amount corresponding to at least one mol of the aldehyde, specifically formaldehyde, for each mol of the diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 or 3 up to 15 or 20 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene gycol, pentaerythritol, etc.; amides such as formamide, stearamide, acrylamide, benzamide, toluene sulfonamides, benzene sulfonamides, adipic diamide, phthalamide, etc.; amines such as ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my copending applications Serial No. 289,273, filed August 9, 1939, now Patent No. 2,281,559, issued May 5, 1942, and Serial No. 400,649, filed July 1, 1941, now Patent No. 2,294,873, issued September 1, 1942; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Dyes, pigments, plasticizers, mold lubricants, opacifiers, curing agents and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be employed in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

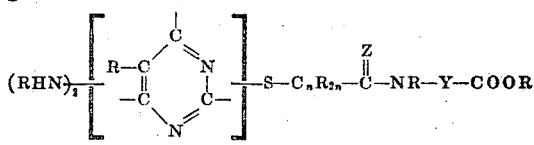

where $n$ represents an integer and is at least 1 and not more than 2, Z represents a member of the class consisting of oxygen and sulfur, Y represents a divalent carbocylic radical, and R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition comprising the condensation product of a plurality of reactants including an aldehyde and a compound corresponding to the general formula

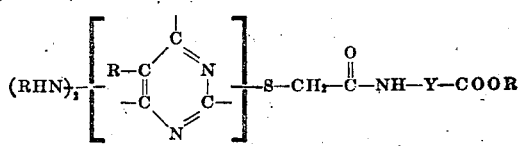

where Y represents a divalent carbocyclic radical, and R represents a member of the class consisting of hydrogen and monovalent hydrocarbon and halo-hydrocarbon radicals.

5. A composition comprising the condensation product of ingredients comprising an aldehyde and a diamino pyrimidyl carboaliphaticoxycarbocyclic-carbamyl-methyl sulfide.

6. A composition comprising the condensation product of ingredients comprising an aldehyde and a diamino pyrimidyl carboaromaticoxycarbocyclic-carbamyl-methyl sulfide.

7. A resinous composition comprising the product of reaction of ingredients comprising an aldehyde and a diamino pyrimidyl carboalkoxyaryl-carbamyl-methyl sulfide.

8. A heat-curable resinous composition comprising a heat-convertible condensation product of ingredients comprising formaldehyde and a diamino pyrimidyl carboalkoxyphenyl-carbamyl-methyl sulfide.

9. A product comprising the heat-cured resinous composition of claim 8.

10. A composition comprising the resinous product of reaction of ingredients comprising an aldehyde and a diamino pyrimidyl carboethoxyphenyl-carbamyl-methyl sulfide.

11. A resinous composition comprising the product of reaction of a mixture containing formaldehyde and 4,6-diamino pyrimidyl-2 para-carboethoxyphenyl-carbamyl-methyl sulfide.

12. A composition containing as an essential component the product of reaction of ingredients comprising an aldehyde and a diamino pyrimidyl carboalkoxytolyl-carbamyl-methyl sulfide.

13. A composition comprising the product of reaction of ingredients comprising a urea, an aldehyde and a compound corresponding to the general formula

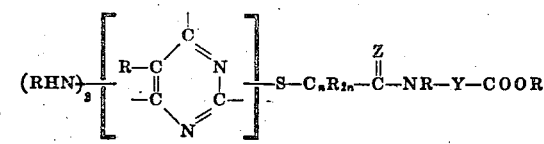

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

14. A composition as in claim 13 wherein the urea component is the compound corresponding to the formula $NH_2CONH_2$ and the aldehyde is formaldehyde.

15. A heat-curable composition comprising the heat-convertible resinous reaction product of (1) a partial condensation product of ingredients comprising formaldehyde and a diamino pyrimidyl carboalkoxycarbocyclic - carbamyl - methyl sulfide, and (2) a curing reactant.

16. A composition as in claim 15 wherein the curing reactant is a chlorinated acetamide.

17. A composition comprising the product of reaction of ingredients comprising urea, formaldehyde and a diamino pyrimidyl carboxyaryl-carbamyl-methyl sulfide.

18. A composition containing the resinous product of reaction of ingredients comprising a methylol urea and a diamino pyrimidyl carboalkoxyaryl-carbamyl-methyl sulfide.

19. A composition comprising the condensation product of a plurality of reactants including melamine, formaldehyde and a diamino pyrimidyl carboalkoxyaryl-carbamyl-methyl sulfide.

20. The method of preparing new condensation products which comprises effecting reaction between ingredients comprising an aldehyde and a compound corresponding to the general formula

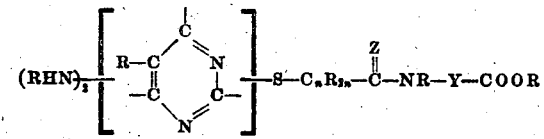

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

GAETANO F. D'ALELIO.